US011875920B2

(12) United States Patent
Grant et al.

(10) Patent No.: US 11,875,920 B2
(45) Date of Patent: Jan. 16, 2024

(54) CABLE WITH LOW MODE CONVERSION PERFORMANCE

(71) Applicant: LUXSHARE TECHNOLOGIES INTERNATIONAL, INC., Milpitas, CA (US)

(72) Inventors: Charles Lloyd Grant, Dongguan (CN); Andrew John Nowak, Dongguan (CN); Jinchang Dai, Dongguan (CN); Bentao Hu, Dongguan (CN); Huanzhong Yan, Dongguan (CN); Henning Lillegaard Hansen, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 0 days.

(21) Appl. No.: 17/535,809

(22) Filed: Nov. 26, 2021

(65) Prior Publication Data

US 2023/0170109 A1 Jun. 1, 2023

(51) Int. Cl.
*H01B 7/02* (2006.01)
*H01B 11/18* (2006.01)
(Continued)

(52) U.S. Cl.
CPC ......... *H01B 7/0216* (2013.01); *H01B 7/0823* (2013.01); *H01B 11/002* (2013.01); *H01B 11/1847* (2013.01); *H01B 11/203* (2013.01)

(58) Field of Classification Search
CPC .. H01B 7/0216; H01B 7/0823; H01B 11/002; H01B 11/1847; H01B 11/203
See application file for complete search history.

(56) References Cited

U.S. PATENT DOCUMENTS 4,185,162 A * 1/1980 Bogese ................ H01B 7/0838 174/32
4,851,060 A * 7/1989 Wade, Jr. .............. H01F 41/122 428/378

(Continued)

FOREIGN PATENT DOCUMENTS

CN 213519296 U * 6/2021 ........... H01B 11/002

OTHER PUBLICATIONS

"High speed data cables", ParaLink® 50s Twinax high speed cables—Leoni, Nov. 24, 2021, 1 page, https://www.leoni-data.com/en/products/copper-fiber-optic-cables/paralink-twinax-high-speed-cables/paralink-50s-twinax-high-speed-cables/.

*Primary Examiner* — William H. Mayo, III
*Assistant Examiner* — Rhadames Alonzo Miller
(74) *Attorney, Agent, or Firm* — Birch, Stewart, Kolasch & Birch, LLP

(57) ABSTRACT

A cable includes a first metal conductor, a first insulator, a second metal conductor and a second insulator. The first insulator is at least partially wrapped on the first metal conductor. The second insulator is at least partially wrapped on the second metal conductor. The first metal conductor is adapted to transmit a first signal. The second metal conductor is adapted to transmit a second signal. The cable also includes an intermediate layer material at least partially wound on the first insulator and the second insulator. A dielectric constant of the intermediate layer material is lower than that of the first insulator, and the dielectric constant of the intermediate layer material is lower than that of the second insulator. With this arrangement, the cable of the present disclosure is capable of realizing low mode conversion and improving the high frequency characteristics.

17 Claims, 7 Drawing Sheets

(51) Int. Cl.

| | |
|---|---|
| ***H01B 7/08*** | (2006.01) |
| ***H01B 11/00*** | (2006.01) |
| ***H01B 11/20*** | (2006.01) |

(56) References Cited

U.S. PATENT DOCUMENTS

| | | | | |
|---|---|---|---|---|
| 6,395,975 | B1 * | 5/2002 | Bosisio | H01B 9/0611 174/120 SC |
| 6,677,518 | B2 * | 1/2004 | Hirakawa | H01B 11/1091 174/36 |
| 7,790,981 | B2 | 9/2010 | Vaupotic et al. | |
| 8,981,216 | B2 | 3/2015 | Grant et al. | |
| 9,136,042 | B2 * | 9/2015 | Sugiyama | H01B 13/00 |
| 9,660,318 | B2 | 5/2017 | Sugiyama et al. | |
| 9,741,469 | B2 | 8/2017 | Janssen et al. | |
| 10,381,136 | B2 * | 8/2019 | Grant | H01B 11/1066 |
| 10,964,448 | B1 * | 3/2021 | Wright | H01B 3/421 |
| 2003/0150633 | A1 * | 8/2003 | Hirakawa | H01B 11/002 174/36 |
| 2006/0237221 | A1 * | 10/2006 | Glew | H01B 11/06 174/146 |
| 2006/0263512 | A1 * | 11/2006 | Glocker | G01R 33/286 427/2.25 |
| 2011/0247856 | A1 * | 10/2011 | Matsuda | H01B 11/203 174/108 |
| 2012/0090873 | A1 * | 4/2012 | Gundel | H01B 11/1895 174/113 R |
| 2012/0090874 | A1 * | 4/2012 | Pagliuca | B32B 27/08 174/120 SR |
| 2013/0146326 | A1 * | 6/2013 | Gundel | H01B 11/005 174/102 R |
| 2014/0182881 | A1 * | 7/2014 | Huang | H01B 11/1091 174/103 |
| 2015/0031546 | A1 * | 1/2015 | Yagi | H01B 7/0241 505/230 |
| 2015/0294760 | A1 * | 10/2015 | Gundel | H01B 11/002 174/102 R |
| 2016/0343474 | A1 * | 11/2016 | Nichols | H01B 11/1891 |
| 2018/0075948 | A1 * | 3/2018 | Kobayashi | H01B 11/20 |
| 2018/0102204 | A1 * | 4/2018 | Li | H01B 7/17 |
| 2018/0158574 | A1 * | 6/2018 | Dai | H01B 11/1856 |
| 2018/0286536 | A1 * | 10/2018 | Hazenfield | H01B 7/295 |
| 2019/0009512 | A1 * | 1/2019 | Kagawa | B32B 37/203 |
| 2019/0096542 | A1 * | 3/2019 | Huang | H01B 7/0838 |
| 2019/0172611 | A1 * | 6/2019 | Sugiyama | H01B 7/0216 |
| 2019/0198199 | A1 * | 6/2019 | Gundel | H01B 7/0838 |
| 2019/0318841 | A1 * | 10/2019 | Hornung | H01B 11/002 |
| 2020/0185124 | A1 * | 6/2020 | Yang | H01B 7/0861 |
| 2021/0098157 | A1 * | 4/2021 | Cai | H01B 1/02 |
| 2021/0098158 | A1 * | 4/2021 | Zheng | H01B 11/002 |

* cited by examiner

CABLE WITH LOW MODE CONVERSION PERFORMANCE

TECHNICAL FIELD

The present disclosure relates to a cable, which belongs to a technical field of cable connectors.

BACKGROUND

A twin-axial cable with a shielding layer extending in a longitudinal direction is usually adapted to transmit high-speed differential signals with a data rate of 25 Gb/s and above. An important performance parameter of high-speed differential cables is mode conversion, which is also known as s-parameter, SCD21. This is a measurement of the amount of differential signals converted to common mode signals. The common mode signals add noise to the transmitted data, thereby reducing system performance. Cable structures in the prior art easily lead to unbalance of the differential pair, which leads to higher mode conversion.

SUMMARY

An object of the present disclosure is to provide a cable which is capable of realizing low mode conversion.

In order to achieve the above object, the present disclosure adopts the following technical solution: a cable including: a first metal conductor, the first metal conductor being adapted to transmit a first signal; a first insulator, the first insulator being at least partially wrapped on the first metal conductor; a second metal conductor, the second metal conductor being adapted to transmit a second signal; a second insulator, the second insulator being at least partially wrapped on the second metal conductor, the first insulator and the second insulator being adjacent to each other; and an intermediate layer material, the intermediate layer material being at least partially wound on the first insulator and the second insulator; wherein a dielectric constant of the intermediate layer material is lower than a dielectric constant of the first insulator, and the dielectric constant of the intermediate layer material is also lower than a dielectric constant of the second insulator.

Compared with the prior art, the dielectric constant of the intermediate layer material of the cable of the present disclosure is lower than the dielectric constant of the first insulator, and the dielectric constant of the intermediate layer material is lower than the dielectric constant of the second insulator, thereby enabling the cable of the present disclosure to achieve low mode conversion and improve high frequency characteristics.

DETAILED DESCRIPTION

Figure 1:
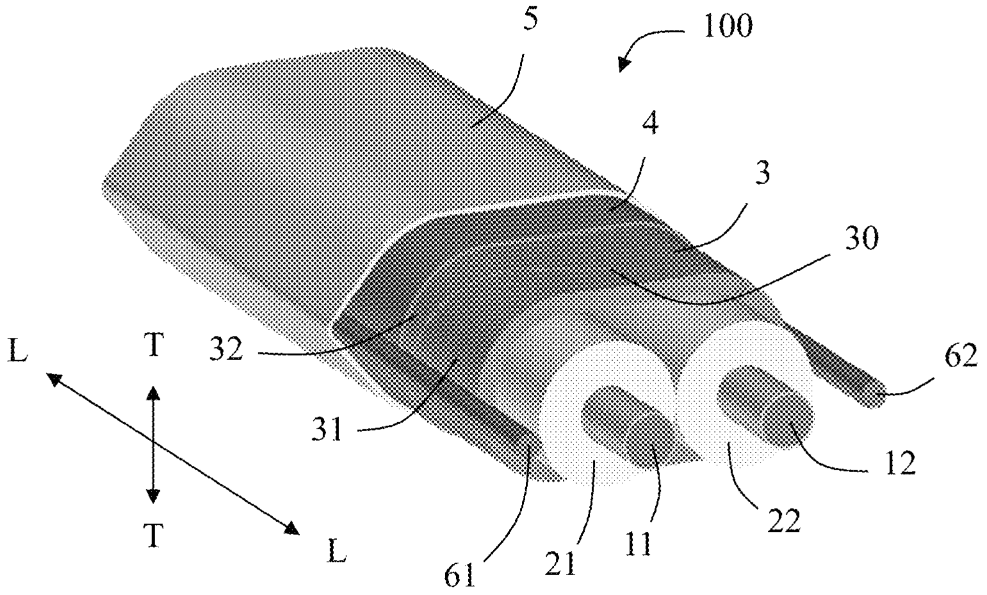
FIG. 1 is a perspective schematic view of a cable in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
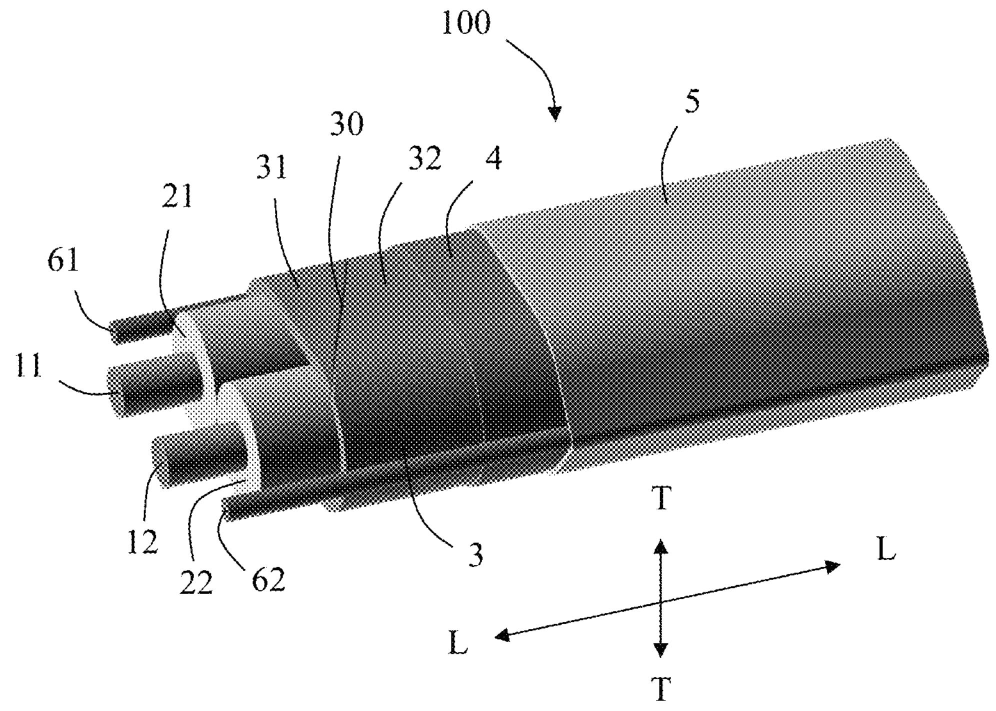
FIG. 2 is a perspective schematic view of FIG. 1 from another angle.
Figure 3:
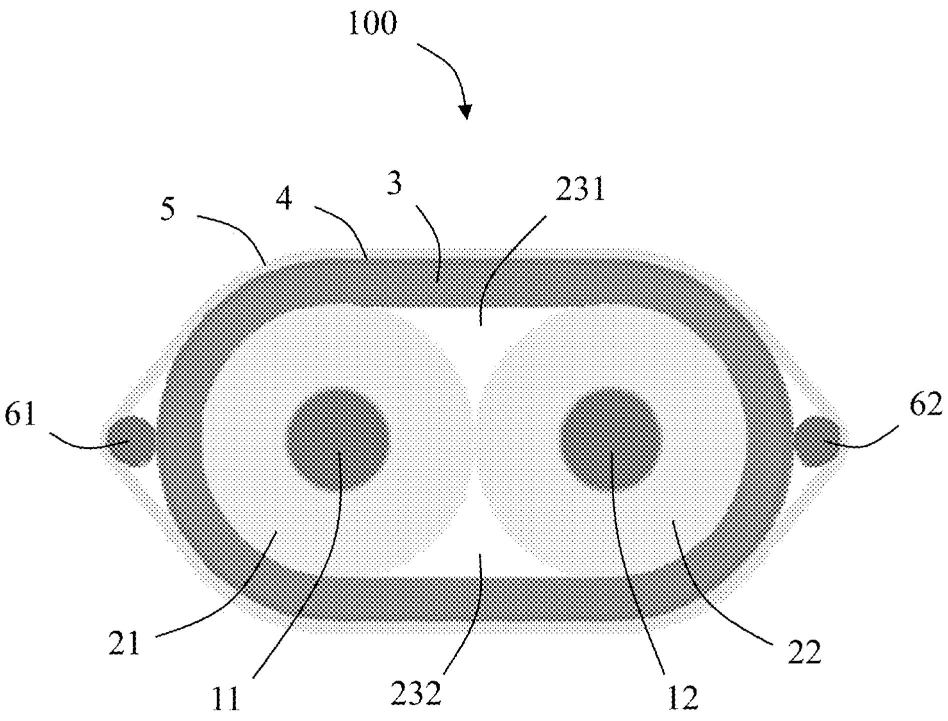
FIG. 3 is a front view of FIG. 1.

Referring to FIGS. 1 to 3, the present disclosure discloses a cable 100 extending along a longitudinal direction L-L. The cable 100 includes a first metal conductor 11, a first insulator 21 at least partially wrapped on the first metal conductor 11, a second metal conductor 12, a second insulator 22 at least partially wrapped on the second metal conductor 12, an intermediate layer material 3 at least partially wound on the first insulator 21 and the second insulator 22, a shielding layer 4 at least partially wrapped on the intermediate layer material 3, and an insulating skin 5 at least partially wrapped on the shielding layer 4.

In an embodiment illustrated in the present disclosure, the first metal conductor 11 and the second metal conductor 12 are of cylindrical configurations. The first metal conductor 11 is adapted to transmit a first signal, and the second metal conductor 12 is adapted to transmit a second signal. In one embodiment of the present disclosure, the first signal and the second signal form a high-speed differential pair. In one embodiment of the present disclosure, the first metal conductor 11 and the second metal conductor 12 are silver-plated copper wires so as to improve the quality of signal transmission.

Referring to FIGS. 1 to 3, in an embodiment of the present disclosure, the first insulator 21 and the second insulator 22 are adjacent to each other and are arranged in parallel. In an embodiment of the present disclosure, the first insulator 21 and the second insulator 22 contact with each other. The first insulator 21 and the second insulator 22 are both of cylindrical configurations. When the first insulator 21 and the second insulator 22 are in contact with each other, the cable 100 includes a first wedge-shaped groove 231 located between the first insulator 21 and the second insulator 22 at an upper position, and a second wedge-shaped groove 232 located between the first insulator 21 and the second insulator 22 at a lower position. Referring to FIG. 3, the first wedge-shaped groove 231 and the second wedge-shaped groove 232 are arranged tip to tip.

In an embodiment of the present disclosure, the first insulator 21 is polyolefin or fluoropolymer, and the second insulator 21 is polyolefin or fluoropolymer. Materials of the first insulator 21 and the second insulator 21 may be the same or different. The intermediate layer material 3 is a buffer insulating layer wound around the first insulator 21 and the second insulator 21. The intermediate layer material 3 has functions of insulating and buffering.

In an embodiment of the present disclosure, a dielectric constant of the intermediate layer material 3 is lower than a dielectric constant of the first insulator 21. The dielectric constant of the intermediate layer material 3 is lower than a dielectric constant of the second insulator 22. With this arrangement, the cable 100 of the present disclosure can realize low mode conversion, thereby improving high frequency characteristics. In the illustrated embodiment of the present disclosure, the intermediate layer material 3 is of a strip-shaped configuration, so that it can be relatively uniformly wrapped on the first insulator 21 and the second insulator 22. In an embodiment of the present disclosure, the intermediate layer material 3 is made of foam polyolefin. The intermediate layer material 3 is spirally wound on the first insulator 21 and the second insulator 22 along the longitudinal direction L-L of the cable 100. Specifically, the intermediate layer material 3 is wound on the first insulator 21 and the second insulator 22 along the longitudinal direction L-L of the cable 100 in a continuous manner. The intermediate layer material 3 basically covers the first wedge-shaped groove 231 and the second wedge-shaped groove 232. The intermediate layer material 3 includes a plurality of turns 31, 32 wound on the first insulator 21 and the second insulator 22. Any two adjacent turns of the intermediate layer material 3 do not overlap in a thickness direction T-T perpendicular to the longitudinal direction L-L. A spacing seam 30 is formed between any two adjacent turns on the intermediate layer material 3 in the longitudinal direction L-L of the cable 100. The spacing seam 30 is arranged obliquely and has an included angle with respect to the longitudinal direction L-L of the cable 100. The included angle is less than 90 degrees.

Figure 4:
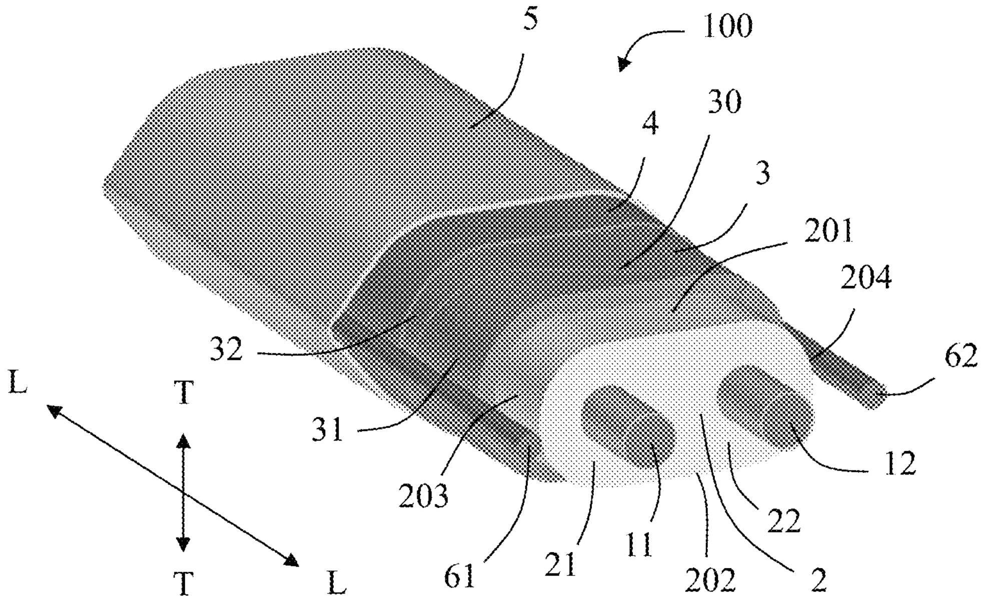
FIG. 4 is a perspective schematic view of a cable in accordance with another embodiment of the present disclosure.

As shown in FIG. 4, a cable 100 in another embodiment of the present disclosure is disclosed. The first insulator 21 and the second insulator 22 are formed into an integral insulator 2. The insulator 2 is of an ellipse configuration, which includes a first flat surface 201, a second flat surface 202 opposite to the first flat surface 201, a first arc surface 203 connected to one side of the first flat surface 201 and one side of the second flat surface 202, and a second arc surface 204 connected to the other side of the first flat surface 201 and the other side of the second flat surface 202. The intermediate layer material 3 is spirally wound on the first flat surface 201, the second flat surface 202, the first arc surface 203 and the second arc surface 204 of the insulator 2 along the longitudinal direction L-L of the cable 100. Specifically, the intermediate layer material 3 is continuously wound on an outer surface of the insulator 2 along the longitudinal direction L-L of the cable 100. The intermediate layer material 3 can be better supported by the first flat surface 201, the second flat surface 202, the first arc surface 203 and the second arc surface 204. The intermediate layer material 3 includes a plurality of turns 31, 32 wound on the insulator 2. Any two adjacent turns do not overlap in a thickness direction T-T perpendicular to the longitudinal direction L-L. A spacing seam 30 is formed between any two adjacent turns on the intermediate layer material 3 in the longitudinal direction L-L of the cable 100. The spacing seam 30 is arranged obliquely and has an included angle with respect to the longitudinal direction L-L of the cable 100. The included angle is less than 90 degrees.

In an embodiment of the present disclosure, the shielding layer 4 is a metal material (for example, aluminum) or a mixed material of metal and plastic (for example, a mixed material of aluminum and polyester). The shielding layer 4 may have one layer or multiple layers.

In an embodiment of the present disclosure, the insulating skin 5 may be made of polyester material.

Referring to FIGS. 1 to 4, in the illustrated embodiment of the present disclosure, the cable 100 further includes a first drain wire 61 and a second drain wire 62 located on opposite sides of the first metal conductor 11 and the second metal conductor 12, respectively. The first drain wire 61 and the second drain wire 62 are both located between the shielding layer 4 and the insulating skin 5. The first drain wire 61 and the second drain wire 62 are both tin-plated copper wires. Of course, in other embodiments, the first drain wire 61 and the second drain wire 62 may be arranged in other positions of the cable 100.

In the related art, in order to ensure that the intermediate layer material 3 can fully cover the first insulator 21 and the second insulator 22, when the intermediate layer material 3 is wound, any adjacent two turns usually partially overlap at the seam. In addition, in order to obtain good mechanical reliability, those skilled in the art require the intermediate layer material 3 to have good mechanical strength. In order to improve the mechanical strength, those skilled in the art tend to choose harder and thicker cushioning materials. However, harder and thicker cushioning materials are not easy to achieve uniformity during wrapping, which will cause wrinkles and air pockets, thereby affecting the integrity performance of high frequency signals.

However, the present disclosure provides a solution different from those in the related art. That is, in order to ensure that the signal has good high frequency characteristics, on the intermediate layer material 3 of the cable 100 of the present disclosure, any two adjacent turns do not overlap in the thickness direction T-T, and any two adjacent turns on the intermediate layer material 3 have a spacing seam 30 between any two adjacent turns in the longitudinal direction L-L of the cable 100.

Figure 5:
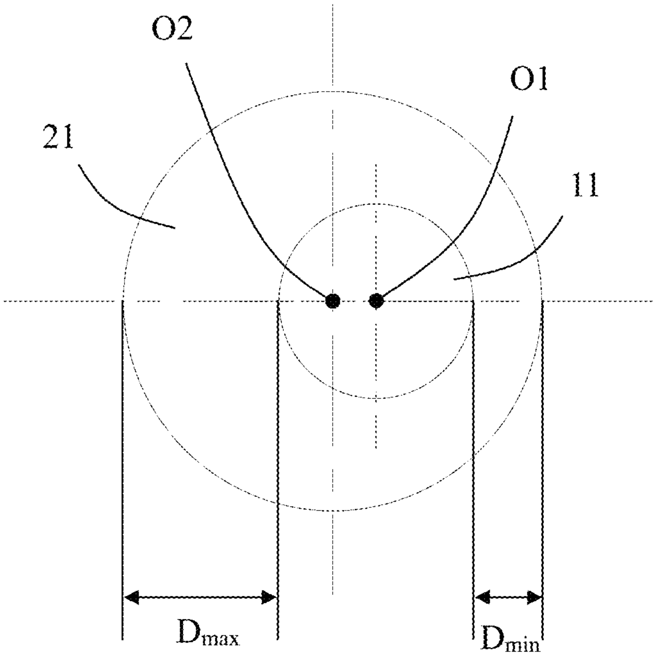
FIG. 5 is a schematic view when a metal conductor and an insulator are eccentric.

As shown in FIG. 5, one of the reasons for the mode conversion in the cable is that the position of a metal conductor is not in a center of a corresponding insulator. Taking the first metal conductor 11 and the first insulator 21 as an example, due to manufacturing reasons, a center O1 of the first metal conductor 11 deviates from a center O2 of the first insulator 21, that is, the coaxiality of the two is not 100%. The calculation formula of the coaxiality is as follows: coaxiality=$D_{max}/D_{min}$*100%, where $D_{max}$ represents a maximum distance between the first metal conductor 11 and the first insulator 21 on the same side, $D_{min}$ represents a minimum distance between the first metal conductor 11 and the first insulator 21 on the same side. In the manufacture of cables, the qualified coaxiality can generally be considered as no less than 95%.

Figure 6:
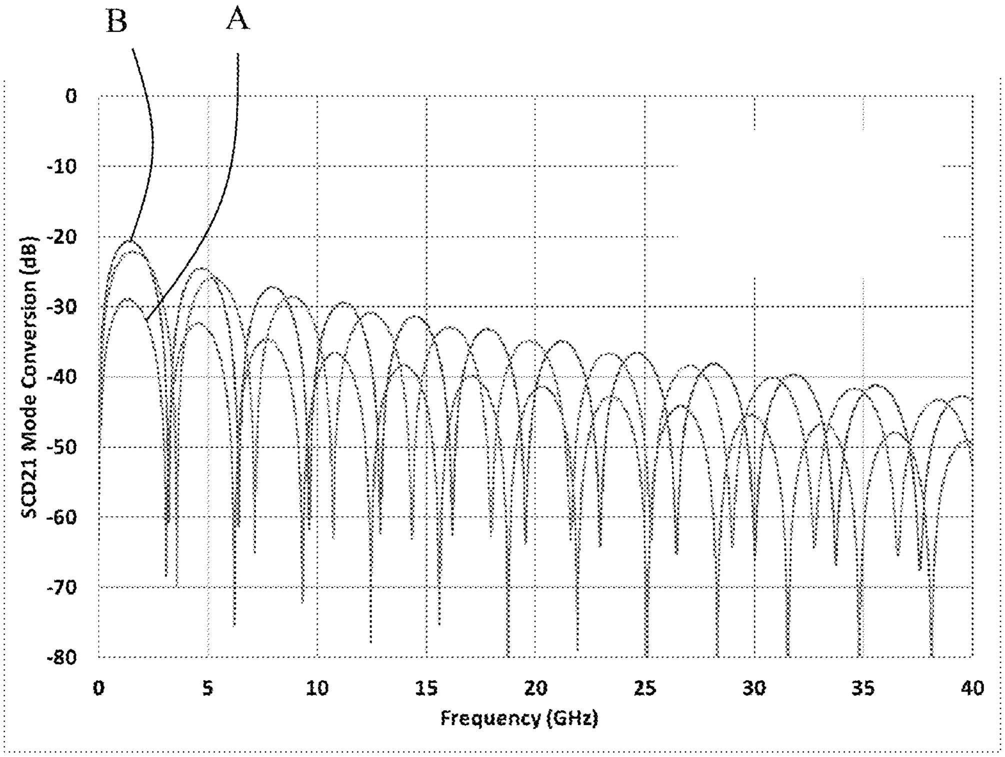
FIG. 6 is a comparison diagram of test mode conversion between the cable of the present disclosure when the coaxiality is 95% and an existing cable in the related art.

Referring to FIG. 6, the present disclosure takes the worst case coaxiality of 95% as an example to test the mode conversion level, where the abscissa in FIG. 6 represents the frequency (unit: GHz), the ordinate represents the mode conversion (unit: dB), curve A represents the test result of the cable 100 in the embodiment of the present disclosure, and curve B represents the test result of the cable without interlayer material. It can be seen from FIG. 6 that the cable 100 of the present disclosure has lower mode conversion, so that it has better high frequency characteristics.

Figure 7:
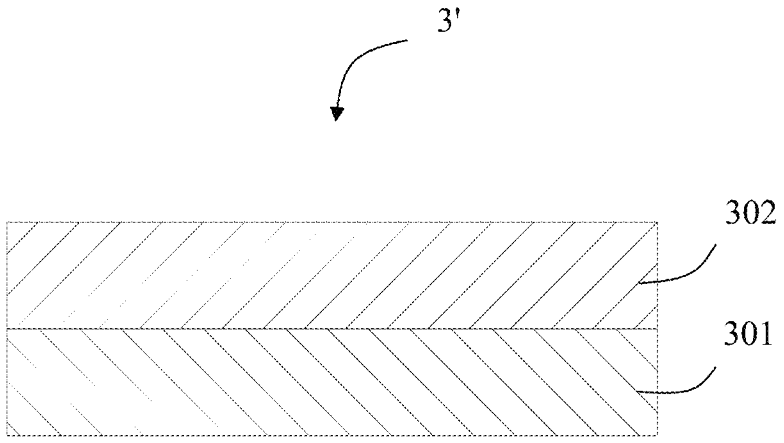
FIG. 7 is a schematic cross-sectional view of an intermediate layer material in another embodiment.

Due to the material thickness of the intermediate layer material 3, in some embodiments, the intermediate layer material 3 needs to be set as two or more layers. In some embodiments, the intermediate layer material 3 includes a plurality of layers. One of the plurality of layers is wound by a successive one of the plurality of layers. For example, a first layer of the intermediate layer material 3 is wound on the first insulator 21 and the second insulator 22, the first layer of the intermediate layer material 3 is wound by a second layer of the intermediate layer material 3, and the second layer of the intermediate layer material 3 is wound by a third layer of the intermediate layer material 3, and so on. In another embodiment, the cable 100 includes a first metal conductor 11, a first insulator 21 at least partially wrapped on the first metal conductor 11, a second metal conductor 12, a second insulator 22 at least partially wrapped on the second metal conductor 12, an intermediate layer material 3' wound at least partially on the first insulator 21 and the second insulator 22, a shielding layer 4 at least partially wrapped on the intermediate layer material 3, and an insulating skin 5 at least partially wrapped on the shielding layer 4. As shown in FIG. 7, the intermediate layer material 3' has two layers, including a first layer 301 and a second layer 302. In one embodiment, the first layer 301 and the second layer 302 have the same structure, and are the same as the structure of the intermediate layer material 3. The first layer 301 of the intermediate layer material 3' is at least partially wound on the first insulator 21 and the second insulator 22. The second layer 302 of the intermediate layer material 3' is at least partially wound on the first layer 301 of the intermediate layer material 3'.

In one embodiment of the present disclosure, a spiral winding direction of the first layer 301 of the intermediate layer material 3' is opposite to that of the second layer 302 of the intermediate layer material 3'. The spacing seam 30 of the first layer 301 of the intermediate layer material 3' and the spacing seam 30 of the second layer 302 of the intermediate layer material 3' overlap each other intermittently.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A cable, comprising:

a first metal conductor, adapted to transmit a first signal;

a first insulator, at least partially wrapped on the first metal conductor;

a second metal conductor, adapted to transmit a second signal;

a second insulator, at least partially wrapped on the second metal conductor, the first insulator and the second insulator being adjacent to each other; and an intermediate layer material, at least partially wound on the first insulator and the second insulator;

wherein a dielectric constant of the intermediate layer material is lower than a dielectric constant of the first insulator, and the dielectric constant of the intermediate layer material is also lower than a dielectric constant of the second insulator;

wherein the intermediate layer material is of a strip-shaped and a single-layered configuration, and is spirally wound on the first insulator and the second insulator along a longitudinal direction of the cable;

wherein the intermediate layer material is wound on the first insulator and the second insulator along the longitudinal direction of the cable in a continuous manner; wherein the intermediate layer material comprises a plurality of turns wound on the first insulator and the second insulator; and wherein two adjacent turns of the intermediate layer material do not overlap in a thickness direction perpendicular to the longitudinal direction; and wherein the intermediate layer material comprises a spacing seam located between the two adjacent turns in the longitudinal direction of the cable so as to separate the two adjacent turns in the longitudinal direction.

2. The cable according to claim 1, wherein an included angle is formed by the spacing seam and the longitudinal direction of the cable.

3. The cable according to claim 2, wherein the included angle is less than 90 degrees.

4. The cable according to claim 1, wherein the intermediate layer material comprises a first layer and a second layer, the first layer of the intermediate layer material is at least partially wound on the first insulator and the second insulator, and the second layer of the intermediate layer material is at least partially wound on the first layer of the intermediate layer material.

5. The cable according to claim 4, wherein a spiral winding direction of the first layer of the intermediate layer material is opposite to a spiral winding direction of the second layer of the intermediate layer material.

6. The cable according to claim 4, wherein the spacing seam of the first layer of the intermediate layer material and the spacing seam of the second layer of the intermediate layer material overlap each other intermittently.

7. The cable according to claim 1, wherein the intermediate layer material is foam polyolefin.

8. The cable according to claim 1, wherein the first insulator and the second insulator are disposed in parallel and contact with each other; and wherein the first insulator and the second insulator are both of cylindrical configurations.

9. The cable according to claim 1, wherein the first insulator and the second insulator are formed as an integral insulator.

10. The cable according to claim 1, wherein the insulator comprises a first flat surface, a second flat surface opposite to the first flat surface, a first arc surface connected to one side of the first flat surface and one side of the second flat surface, and a second arc surface connected to the other side of the first flat surface and the other side of the second flat surface.

11. The cable according to claim 1, wherein the first metal conductor and the second metal conductor are both silver-plated copper wires.

12. The cable according to claim 1, wherein the first insulator is polyolefin or fluoropolymer, and the second insulator is polyolefin or fluoropolymer.

13. The cable according to claim 1, further comprising a shielding layer at least partially wrapped on the intermediate layer material and an insulating skin at least partially wrapped on the shielding layer.

14. The cable according to claim 13, further comprising a first drain wire and a second drain wire located on opposite sides of the first metal conductor and the second metal conductor, respectively; wherein the first drain wire and the second drain wire are both located between the shielding layer and the insulating skin; and wherein the first drain wire and the second drain wire are both tin-plated copper wires.

15. The cable according to claim 13, wherein the shielding layer is a metal material, or a mixed material of metal and plastic.

16. The cable according to claim 1, wherein the intermediate layer material is wound on the first insulator and the second insulator along a longitudinal direction of the cable in a continuous manner.

17. The cable according to claim 1, wherein the intermediate layer material comprises a plurality of layers, and one of the plurality of layers is wound by a successive one of the plurality of layers.

* * * * *